J. J. FARRINGTON.
VEHICLE JACK.
APPLICATION FILED NOV. 11, 1919.

1,359,044. Patented Nov. 16, 1920.

Witnesses,
Geo. A. Gruss
Augustus B. Coppes

Inventor,
James J. Farrington
By Joshua R. H. Potts
his Attorney.

UNITED STATES PATENT OFFICE.

JAMES J. FARRINGTON, OF PHILADELPHIA, PENNSYLVANIA.

VEHICLE-JACK.

1,359,044.  Specification of Letters Patent.  Patented Nov. 16, 1920.

Application filed November 11, 1919. Serial No. 337,162.

*To all whom it may concern:*

Be it known that I, JAMES J. FARRINGTON, a citizen of the United States, residing at Philadelphia, in the county of Philadelphia and State of Pennsylvania, have invented certain new and useful Improvements in Vehicle-Jacks, of which the following is a specification.

One object of my invention is to provide a vehicle jack which can be readily secured as a permanent fixture on a vehicle such for example as an automobile and when not desired for use will be in such position that it will be clear of the roadway but when desired for use can be readily moved into a position to raise the vehicle wheels out of a rut or above the surface of the roadway.

Another object is to provide my improved jack with a wheel which will serve as an auxiliary rotatable support for the vehicle so that when brought into engagement with the roadway or a board placed upon the roadway, it will serve to lift the vehicle wheel out of a rut or soft spot in the roadway and will serve as rotatable supporting means for the vehicle to permit the vehicle to be moved into another position until said vehicle wheel has reached a position over a hard portion of the roadway, after which the jack wheel can be moved to permit said vehicle wheel to again engage the roadway.

A still further object is to make my improved jack of a strong and durable construction and so that it can be easily and quickly attached to a vehicle.

These objects, and other advantageous ends which will be described hereinafter, I attain in the following manner, reference being had to the accompanying drawings in which—

Figure 1:
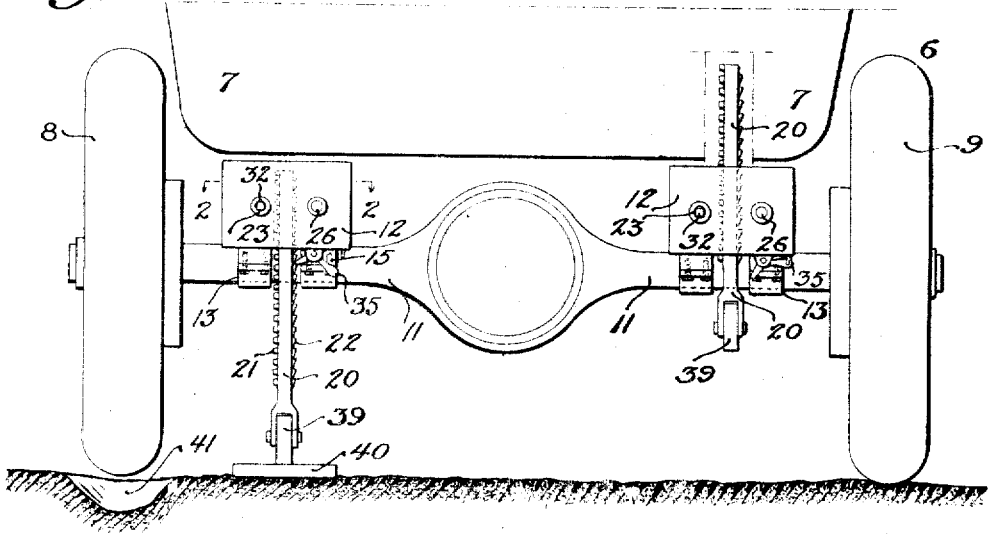
Figures 2, 5:
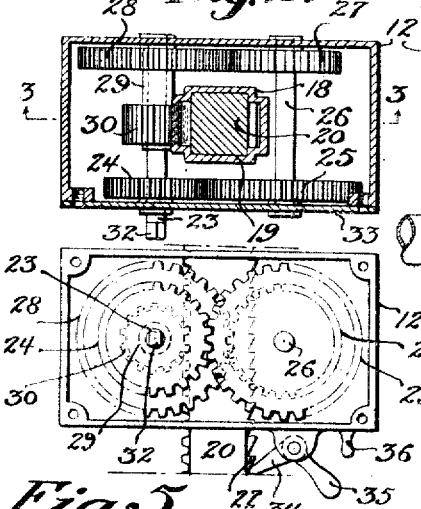
Figure 3:
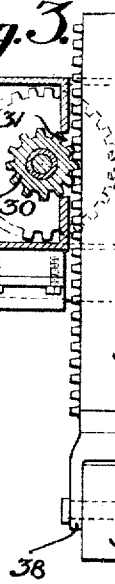
Figure 4:
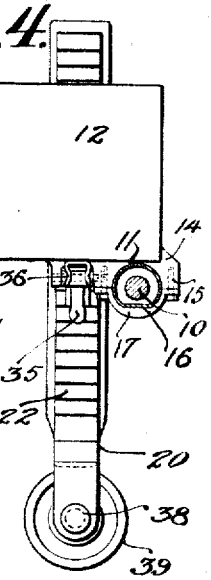

Figure 1 is a rear elevation of an automobile showing the same equipped with two of my improved jacks, one adjacent each driving wheel, and also illustrating one of the jacks having lifted one of the vehicle wheels out of a soft spot or rut in the roadway and providing a rotatable support so that the vehicle can be moved by the propelling means into another position on the roadway, Fig. 2 is an enlarged sectional plan view taken on the line 2—2 of Fig. 1, Fig. 3 is an enlarged fragmentary elevation taken on the line 3—3 of Fig. 2, Fig. 4 is a side elevation of Fig. 3, and Fig. 5 is a fragmentary front elevation of Fig. 2 with the cover plate of the casing removed.

Referring to the drawings, 6 represents an automobile having a body 7 and driving wheels 8 and 9 which are operated by means of an axle 10 inclosed within the usual housing 11.

In Fig. 1 I have illustrated two of my improved jacks and since these jacks are similarly constructed I will describe but one in detail. Each jack includes a casing 12 which is secured in the present instance, to the axle housing 11 by means of plates 13 which are attached to depending portions 14 of the casing 12 by means of bolts 15. The housing 11 is preferably flattened as shown at 16 and the plates 13 have corresponding inner flat portions 17 (see Fig. 4) for engaging said flat portions of the housing so as to prevent rotation on the housing when the plates 13 are secured in position.

A hollow partition 18 extends from top to bottom of the casing 12 and provides a passageway 19 for a jack lifting rod 20, said lifting rod being made of heavy strong metal and including on one side a toothed gear-engaging rack 21 and on the opposite side a pawl ratchet rack 22, said racks extending in the direction of the height of the jack lifting rod 20, as clearly shown in Figs. 2 to 4 inclusive.

The casing 12 provides a bearing for an operating shaft 23 which has secured to it within said casing, a gear wheel 24 which meshes with a larger gear wheel 25 on a counter shaft 26, said counter shaft having a bearing in said casing 12. The counter shaft has a second gear wheel 27 secured thereto and of smaller diameter than the gear wheel 25 and this gear wheel 27 meshes with a larger gear wheel 28 on a sleeve 29; said sleeve being loosely mounted on the operating shaft 23. The sleeve 29 also has a small gear wheel or pinion 30 secured thereto which extends through an aperture 31 in the hollow partition 18 and engages the teeth of the rack 21. It is thus obvious that by rotating the operating shaft 23, the jack lifting rod 20 can be raised or lowered according to the direction of rotation of said operating shaft. This operating shaft is preferably provided with an angular end 32 which projects through the cover plate portion 33 of the casing 12 and may be engaged by a crank lever or handle (not illustrated) whereby the jack lifting rod can be manipulated. A detent pawl 34 is pivotally connected to the bottom of the casing 12 and operatively engages the teeth of the ratchet rack 22 for preventing relative movement in one direction between the casing 12 and jack lifting rod 20. The pawl 34 has a weighted handle 35 which normally holds the pawl in engagement with the teeth of the ratchet rack 22 and when the pawl is to be released from the rack 22, the weighted handle 35 can be moved upwardly into engagement with a spring retaining-clip 36 which is secured to the bottom of the casing 12.

The lower end of the jack lifting rod 20 is bifurcated as shown at 37 and the furcations of the lower end of said lifting rod provide a bearing for an axle 38. An auxiliary supporting roller or wheel 39 is supported on the axle 38 between the furcations at the lower end of said lifting rod 20.

During the normal operation of the vehicle, the lifting rod 20 is in a raised position such for example as shown at the right hand side of Fig. 1. If either of the driving wheels, for example, should sink into a rut so that the vehicle could not be moved, it is quite an easy matter to move the jack lifting rod 20 downwardly into engagement with the roadway or preferably to place a board, such as shown at 40 in Fig. 1, directly under the lifting rod 20 and then move said lifting rod 20 downwardly until the auxiliary wheel 39 engages the top of the board 40. This can be done by turning the operating shaft 23 and a continued turning of said operating shaft 23 will cause the vehicle driving wheel to be lifted out of the rut such as shown at 41 and the vehicle will be supported jointly by the opposite driving wheel and the auxiliary wheel 39. By starting the engine of the vehicle, the driving wheel which is in engagement with the ground will move the vehicle forwardly and the auxiliary wheel will roll along the board 40 until the driving wheel which had been stuck in the rut has been moved over a solid or hard portion of the roadway. The jack lifting rod 20 can then be released and moved upwardly into its normal position.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A jack including a casing adapted to be secured to a vehicle, said casing including a hollow partition providing a passageway of angular cross section therethrough; a jack lifting rod slidably fitting said passageway and being provided with a gear-engaging rack; a gear supported within said casing and extending into said passageway so as to mesh with said rack; and means projecting out of said casing for operating said gear whereby said rod is moved through said passageway relatively to said casing, said lifting rod having a pawl-engaging rack thereon and a pawl adapted to engage said rack; substantially as described.

In testimony whereof I have signed my name to this specification in the presence of two subscribing witnesses.

JAMES J. FARRINGTON.

Witnesses:
ANNA RENTON,
CHAS. E. POTTS.